June 12, 1956  R. L. NOWAK  2,749,572
METHOD OF SHAPING THERMOPLASTIC SHEETS
Filed Feb. 11, 1954  2 Sheets-Sheet 1
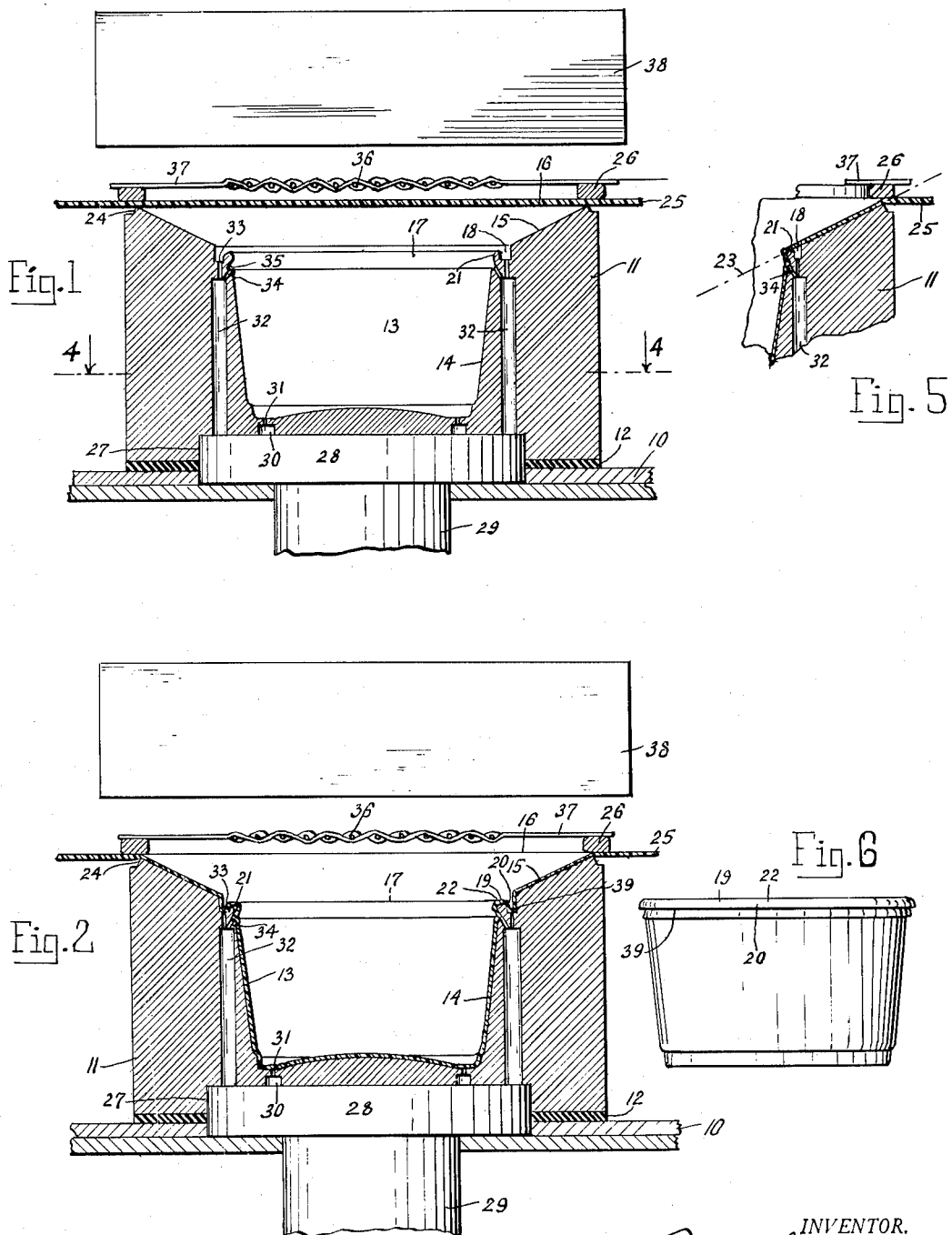
INVENTOR.
Roger L. Nowak
BY Sigmund Herzog
attorney.

June 12, 1956 R. L. NOWAK 2,749,572
METHOD OF SHAPING THERMOPLASTIC SHEETS
Filed Feb. 11, 1954 2 Sheets-Sheet 2

INVENTOR.
Roger L. Nowak
BY Sigmund Herzog
Attorney.

United States Patent Office 2,749,572
Patented June 12, 1956

2,749,572

METHOD OF SHAPING THERMOPLASTIC SHEETS

Roger L. Nowak, West Boylston, Mass., assignor to Van Brode Milling Co., Inc., Clinton, Mass., a corporation of Massachusetts Application February 11, 1954, Serial No. 409,718

3 Claims. (Cl. 18—56)

The present invention relates to a method of shaping sheets of organic thermoplastic material and, more particularly, to the formation therefrom of relatively deep, seamless containers, or the like. More specifically, but not exclusively, the invention is directed to a method of vacuum molding of containers of the type mentioned, the open tops of which are provided with outwardly directed curled edges, to present sealing surfaces for the engagement by closures.

Various methods have been proposed heretofore for deep-drawing of organic plastic sheets by heat and fluid pressure. Such shaping has usually been accomplished by placing and clamping a thermoplastic sheet against the opening of a mold, softening the sheet by heating the same, and withdrawing air from the mold, whereby the sheet is caused to assume the conformation of the mold cavity. In the early stages of this art, heat was applied to the sheet substantially uniformly over its surface. Unequal stretching of the sheet was thereby obtained, the uniformly heated material stretching more at the center of the mold than at the periphery of the latter when the sheet was forced into the mold cavity. This unequal stretching resulted in a product of non-uniform wall thickness. To remedy this serious defect, it has been suggested to use differential heating in conjunction with vacuum forming, whereby differential plasticity is caused to occur in the sheet, the condition of greatest plasticity being effected in those regions of the sheet which, under conditions of uniform plasticity, would normally be expected to stretch least. The general arrangement is such that the greatest heating will occur in those areas of the sheet most closely adjacent to the edge of the mold, since, under conditions of uniform heating, such areas undergo the least stretching. It has been found, however, that non-uniform heating, by itself, does not fully solve the problem.

The main object of the present invention is to provide a novel method for shaping, by vacuum forming thermoplastic sheets into relatively deep containers, which produces a deep-drawn container free from all defects and irrespective of the fact whether or not the container is to be provided with a curled top edge.

With this and other objects in view, which will more fully appear as the nature of the invention is better understood, and in accordance with the present invention, a thermoplastic sheet is clamped across a cavity comprising two merging sections, one forming the mold cavity proper and the other one being disposed above said mold cavity and having a mouth or exposed area which is substantially larger than the mouth of the mold cavity proper. An annular groove is formed around and concentric with the mouth of the mold cavity for the formation of the outwardly directed curled edge on the open top of the container to be produced. The sheet is then subjected to non-uniform heating to effect differential plasticity therein, the condition of greatest plasticity being effected in those regions thereof which, under conditions of uniform plasticity, would stretch the least upon said sheet being forced to assume the conformation of the mold. A vacuum or partial vacuum is then produced in the mold and in said groove, whereby the sheet is made to assume the conformation of both cavity sections and of said groove. The resulting molded shape is allowed to cool and is then removed from the mold, after which the excess material is trimmed off beyond said curled edge.

In order that the invention may be more fully understood, reference is made to the accompanying drawings, showing one of the many possible devices for carrying out the improved method, and in which:

Figure 1 is a central vertical section, partly in elevation and more or less diagrammatic, of an apparatus for carrying out the improved method;

Figure 2 is a similar section, showing the blank shaped to its final form;

Figure 5 is a section of a detail of the apparatus with a portion of the plastic sheet in a condition immediately prior to the final shaping of the sheet; and Figure 6 is an elevation of the finished container.

Figure 3:
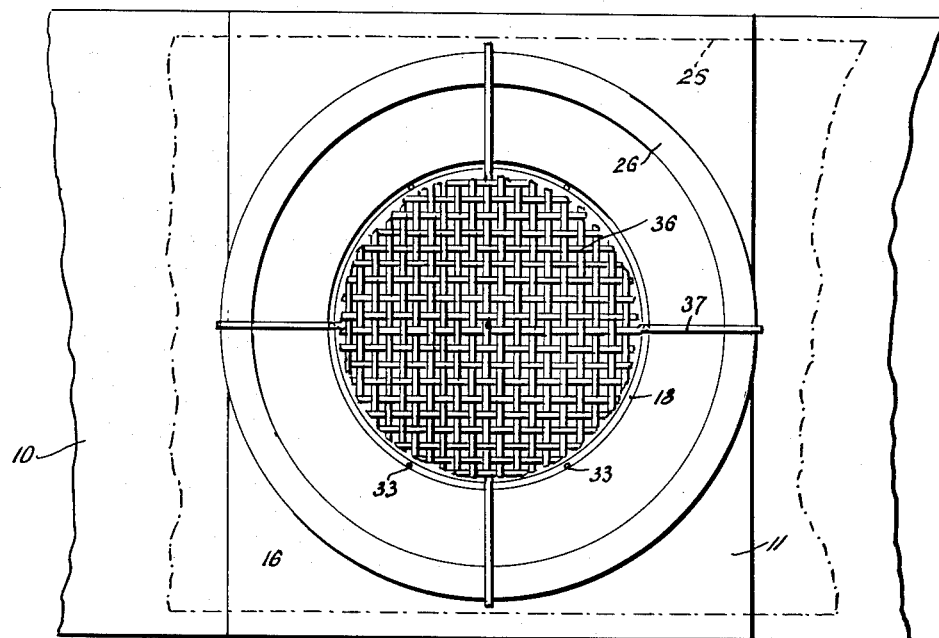
Figure 3 is a top elevation of the apparatus shown in Fig. 1, the heating element and the plastic sheet being removed, more clearly to show the construction and arrangement of the remaining elements of the apparatus.
Figure 4:
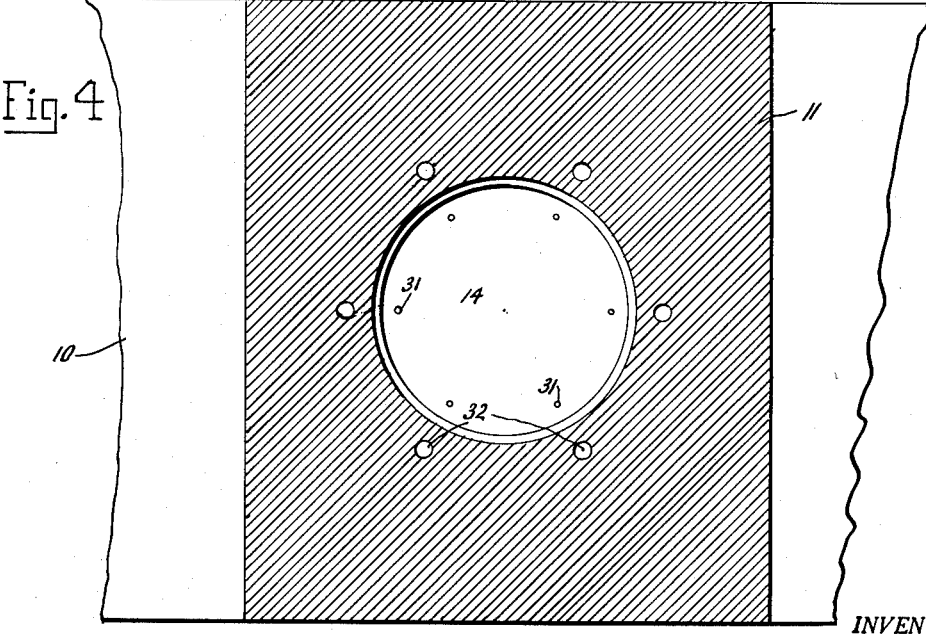
Figure 4 is a section taken on line 4—4 of Fig. 1.

In the drawings, the numeral 10 indicates a support of any suitable size and design. On this support is mounted a mold 11, a gasket 12 of rubber or the like being interposed between said support and said mold. In the mold is formed a cavity 13, comprising two distinct sections, denoted by the numerals 14 and 15. The section 14 constitutes the mold cavity proper, having a configuration corresponding to that of the outer surface of the body portion of the article to be formed. The cavity section 15 is disposed above the mold cavity 14, it opening upward into the top face 16 of the mold, where its mouth area substantially exceeds the area of the mouth 17 of the mold cavity proper. The cavity section 15 gradually decreases in size, it reaching the size of the mouth 17 of the mold cavity proper where the two cavity sections meet. Around the said mouth 17 and in concentric relation thereto is formed in the mold an annular groove 18. The depth of this groove corresponds to the height of the outwardly curled edge 19 of the container to be formed, and the width of said groove exceeds the thickness of the outer wall 20 of said curled edge. Cutting the said groove around the mouth of the mold cavity results in a rib 21. This rib is rounded, whereby the curled edge of the container to be formed obtains a smooth, continuous outer surface 22, adapted for proper cooperation with the sealing element of the container cover. As appears from Figs. 1, 2 and 5 of the drawings, the cavity section 15 is frusto-conical in form. The incline or slope of this cavity section runs, at any given point of the periphery of its mouth, in a line (see the dotted line 23 in Fig. 5) from said periphery to the top of the rib 21. The purpose of this arrangement will be described hereinafter.

Around the cavity section 15 is formed on the mold top a ridge 24, for supporting the thermoplastic sheet or blank 25 of which the container is to be formed. Any suitable means may be employed for securely holding the sheet across the mouth of the mold section 15. In the case illustrated in the drawings, a clamping ring 26 is used, which may be tightened down on the sheet and on the ridge 24 by any suitable means, not shown, the specific means made use of not being critical so long as the sheet or blank 25 is held securely.

In the underface of the mold is provided a recess 27, into which is fitted a vacuum chamber 28, which may be connected by a conduit 29 to any convenient source of vacuum, such as a vacuum pump. The vacuum chamber communicates with a suitable number of channels 30 in the mold body, each channel having a minute outlet 31, leading to and through the bottom portion of the mold cavity proper. The vacuum chamber opens into a second series of channels 32, each of which has two minute outlets 33 and 34, the outlets 33 leading to the groove 18 and the outlets 34 extending to an undercut shoulder 35, which is formed in the face of the mold cavity 14 some distance below the mouth of the latter.

The means for effecting differential plasticity in the thermoplastic sheet comprises a screen, for instance a wire-mesh disk 36, arranged on a spider 37 which rests on the clamping ring 26. The size of the disk, the gauge of the wires thereof and their number per inch may be varied according to the requirements. In the case illustrated in the drawings, the disk 36 extends substantially over the entire area of the mouth 17 of mold cavity 14, but not over the groove 18 around said mouth. Of course it is obvious that the size of said disk may be varied to bring about the desired results.

A suitable distance above the clamping ring 26 is located a heater 38 of any suitable or required type, for instance an electric heater. Means, not shown, are provided for changing the heating effect of the heater, such as for varying its heat output.

Molding in accordance with the present invention is carried out in the above described apparatus by securing the thermoplastic sheet 25 in the position shown in Fig. 1 and placing a disk 36 of suitable size and screening capacity in position on the clamping ring 26, the diameter of the disk 36 and the dimensions of its component parts having been previously determined by experiment so as to effect differential plasticity in the sheet 25, the condition of greatest plasticity being caused to occur in the portion of the sheet over the frusto-conical surface of the cavity section 15 and adjacent the mouth of the mold cavity, which latter sheet portion, under condition of uniform plasticity, would stretch the least when the sheet was caused to assume the conformation of the mold cavity. Inasmuch as the screen covers the central portion of the sheet 25 (Fig. 3), obviously this central portion is heated less than the peripheral portion of the sheet. This peripheral portion is, as will hereinafter appear, drawn onto the inclined wall of the cavity section 15, the slope of which is in alinement with the top of the rib 21, whereby the said peripheral sheet portion is adapted to be stretched and moved readily toward the mold cavity proper when the central portion of the sheet is being drawn into the said mold cavity.

When the sheet has been sufficiently heated and has attained the desired degree of differential plasticity, a vacuum or partial vacuum is created in the chamber 28, whereby the central portion of the sheet is sucked or drawn into the mold cavity and caused to assume the conformation thereof. Initially the peripheral portion of the sheet assumes a true frusto-conical shape, as shown in Fig. 5, that is, the groove 18 remains empty but is covered by the sheet material. It is only during the last stage of the process that the said groove is filled, as shown in Fig. 2, the process of shaping the sheet being then complete. It is to be noted that, if the slope of the cavity section 15 would lead to the base of the groove 18, the rib 21 would act as a dam, obstructing the movement of the peripheral portion of the sheet material. Moreover, the groove 18 would be completely filled so that the outer wall 20 of the curled top edge of the container would be too heavy and thus lack resiliency, in which case, obviously, it could not properly coact with the sealing element of the container cover.

The molded container so obtained is allowed or caused to cool and is then removed from the mold. The surplus material is then trimmed off along the base 39 of the outer wall 20 of the curled top edge of the container. The base 39 forms a demarcation line between the molded sections obtained in the two cavity sections, aiding the operator in the trimming operation.

Thus far the improved method has been described as applied to the production of deep-drawn containers having curled edges around their open tops, bearing in mind that the production of containers of this type presents problems which cannot be solved by the use of the methods heretofore practised. When the method herein described is employed for the production of ordinary deep-drawn, seamless containers, which lack the curled edge, the product obtained is of more uniform wall thickness than the containers which are made by the methods which rely solely on the differential plasticity of the sheet material. The superiority of the product produced by the method herein described is due to the fact that the sheet material is heated so that the condition of greatest plasticity is effected in those regions thereof which lie outside of the area of the mold cavity proper and that the material of greatest plasticity is allowed to move freely and unobstructed toward the mold cavity.

It is obvious that, while herein the production of a container of a specific shape has been described, the invention is not limited to any specific shape or type, and since apparently widely different embodiments of the invention may be produced within the spirit and scope thereof, it is to be understood that the invention is not limited to the specific embodiments thereof except as defined by the appended claims.

What I claim is:

1. The method of shaping a thermoplastic sheet into a deep-drawn container having an outwardly extending curled top edge, which consists in clamping said sheet across a top cavity which slopes toward and connects with a mold cavity and has formed therein an annular groove concentric with and around the mouth of said mold cavity, said annular groove being separated from said mold cavity by a rib the top of which is in alinement with the slope of said top cavity, subjecting said sheet to non-uniform heat to effect differential plasticity in said sheet, said heat being so controlled that the condition of greatest plasticity of said sheet is effected in those regions thereof which lie outside of the area of said mold cavity but include the area of said annular groove, and withdrawing air from both of said cavities whereby said sheet is made to assume the conformation of said cavities.

2. The method of claim 1, wherein said groove is of a width substantially exceeding the thickness of the outer wall of the curled top edge of the container.

3. The method of shaping a thermoplastic sheet into a deep-drawn container having an outwardly extending curled top edge, which consists in clamping said sheet across a top cavity which slopes toward and connects with a mold cavity and has formed therein a groove running parallel with and around the mouth of said mold cavity, said groove being separated from said mold cavity by a rib the top of which is in alinement with the slope of said top cavity, subjecting said sheet to non-uniform heat to effect differential plasticity in said sheet, said heat being so controlled that the condition of greatest plasticity of said sheet is effected in those regions thereof which lie outside of the area of said mold cavity but include the area of said groove, and withdrawing air from both of said cavities whereby said sheet is made to assume the conformation of said cavities.

References Cited in the file of this patent

UNITED STATES PATENTS

| | | |
|---|---|---|
| 1,415,018 | Coates | May 9, 1922 |
| 1,904,268 | Bronson | Apr. 18, 1933 |
| 2,377,946 | Leary | June 12, 1945 |
| 2,425,390 | Palmer et al. | Aug. 12, 1947 |
| 2,444,420 | Borkland | July 6, 1948 |
| 2,556,016 | Turshin | June 5, 1951 |